(12) United States Patent
Wu

(10) Patent No.: US 8,753,023 B2
(45) Date of Patent: Jun. 17, 2014

(54) ADAPTER TRANSMITTING WITH ELECTRICAL AND OPTICAL SIGNALS

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 212 days.

(21) Appl. No.: 13/221,807

(22) Filed: Aug. 30, 2011

(65) Prior Publication Data

US 2012/0051699 A1 Mar. 1, 2012

(30) Foreign Application Priority Data

Sep. 1, 2010 (CN) .......................... 2010 2 0513061

(51) Int. Cl.
*G02B 6/36* (2006.01)

(52) U.S. Cl.
USPC ................................. 385/93; 385/88; 385/89

(58) Field of Classification Search
USPC ............................................. 385/88, 89, 93
See application file for complete search history.

(56) References Cited

U.S. PATENT DOCUMENTS

| | | | |
|---|---|---|---|
| 6,058,235 A * | 5/2000 | Hiramatsu et al. | ............ 385/135 |
| 7,549,894 B1 | 6/2009 | Wang et al. | |
| 7,651,379 B1 | 1/2010 | Wu | |
| 2011/0123158 A1 * | 5/2011 | Little et al. | ...................... 385/77 |

* cited by examiner

*Primary Examiner* — Jerry Blevins
(74) *Attorney, Agent, or Firm* — Wei Te Chung; Ming Chieh Chang

(57) ABSTRACT

An adapter (100) includes a printed circuit board (9), a first connector mounted onto the printed circuit board and having a room, a second connector mounted onto the printed circuit board and having a chamber (62), and an optical device (8) including a first optical module (81) and a second optical module (82) optically connecting with each other. The first connector includes a tongue portion (11) extending into the room and a set of terminals (212, 222) having contacting portions (2120, 2220) disposed on one side of the tongue portion and exposed to the room. The first optical module is disposed on another side of the tongue portion (11) opposite to the contacting portions. The second connector includes a set of contacts (66) having contacting sections (661) exposed to the chamber. The second optical module is disposed on the second connector and communicates with the chamber (62).

20 Claims, 8 Drawing Sheets

US 8,753,023 B2

ADAPTER TRANSMITTING WITH ELECTRICAL AND OPTICAL SIGNALS

BACKGROUND OF THE INVENTION

1. Field of the Invention

The present invention relates to an adapter, and more particularly to an adapter adapted for transmitting electrical and optical signals.

2. Description of Related Art

Nowadays, adapters have been very popular for interconverting electrical connectors of different protocol so as to make it possible for electrically connecting different kinds of electronic devices having diverse interfaces such as USB, SATA, HDMI, DiiVA, and so on. However, optical signal transmitting also has been gradually widely used and incorporated into the electrical connectors, so that the electrical connectors could offer both electrical and optical signals transmitting, however no adapter has been designed for converting both electrical and optical transmitting.

Hence, an adapter used for transmitting both electrical and optical signals is desired to overcome the above problems.

BRIEF SUMMARY OF THE INVENTION

According to one aspect of the present invention, an adapter comprises: a printed circuit board, a first connector mounted onto the printed circuit board and defining a room, a second connector mounted onto the printed circuit board and defining a chamber, and an optical device comprising a first optical module and a second optical module optically connecting with each other. The first connector comprises a tongue portion extending into the room and a plurality of terminals having contacting portions disposed on one side of the tongue portion and exposed to the room. The first optical module is disposed on another side of the tongue portion opposite to the contacting portions. The second connector comprises a plurality of contacts having contacting sections exposed to the chamber. The second optical module is disposed on the second connector and communicates with the chamber.

According to another aspect of the present invention, an adapter comprises: a printed circuit board, a first plug connector mounted onto the printed circuit board, a second receptacle connector mounted onto the printed circuit board to be interconvertible with the first plug connector, and an optical device. The first plug connector comprises a metallic means, an insulative housing having a tongue portion shielded by the metallic means, and a plurality of terminals coupled to the insulative housing for electrical signal transmission. The tongue portion has a cavity recessed downwardly at a top side thereof and a depression recessed upwardly at a bottom side thereof. The terminals have contacting portions disposed on the top side of the tongue portion and exposed to the cavity. The second receptacle connector comprises a chamber, and a plurality of contacts for electrical signal transmission and having contacting sections exposed to the chamber. The optical device comprises a first optical module being received in the depression of the tongue portion for optical signal transmission, a second optical module being disposed on the second receptacle connector and communicating with the chamber for optical signal transmission, and a plurality of optical fibers optically connecting the first and second optical modules.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details.

Referring to FIGS. 1-8, an adapter 100 according to an embodiment of the present invention comprises a PCB (printed circuit board) 9, a first and second connectors (not labeled) mounted onto the PCB 9 simultaneously in a back to back manner and converted into each other via the PCB 9, an optical device 8, a metallic outer shell 7 surrounding the first connector, the second connector and the PCB 9, and an external case 5 surrounding the metallic outer shell 7.

Figure 6:
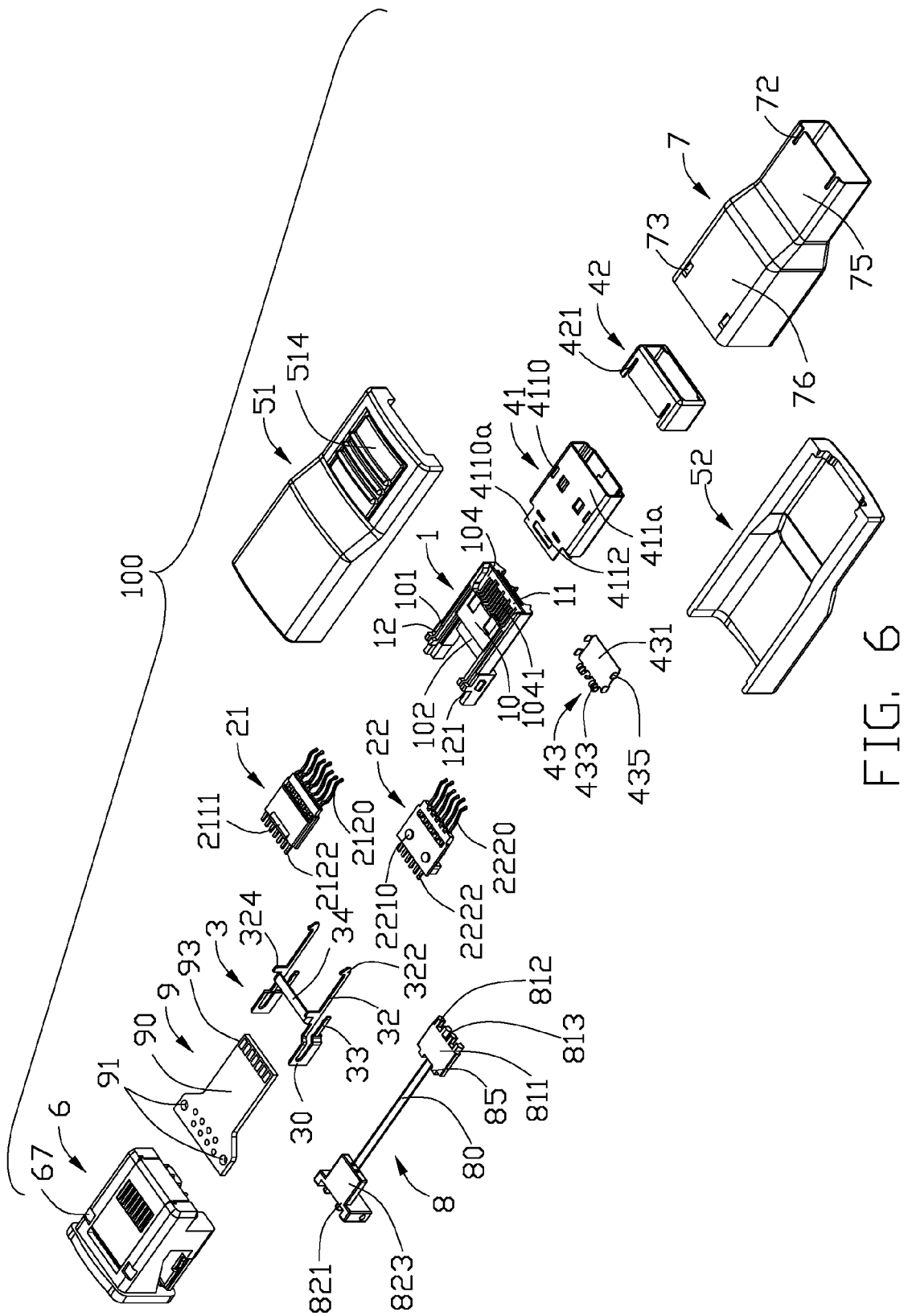
FIG. 6 is an exploded view of the adapter shown in FIG. 1.
Figure 7:
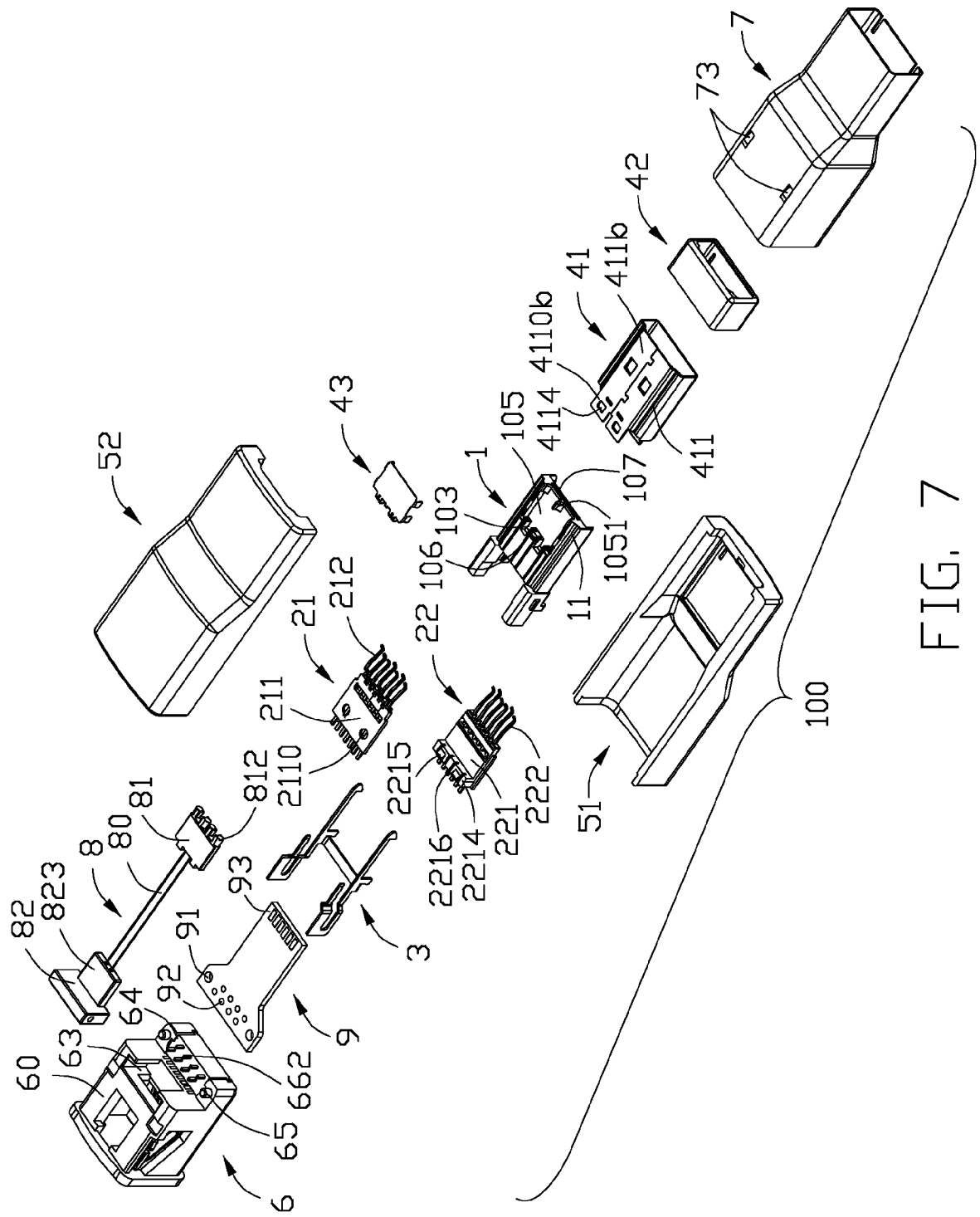
FIG. 7 is similar to FIG. 6, but viewed from another aspect.
Figure 8:
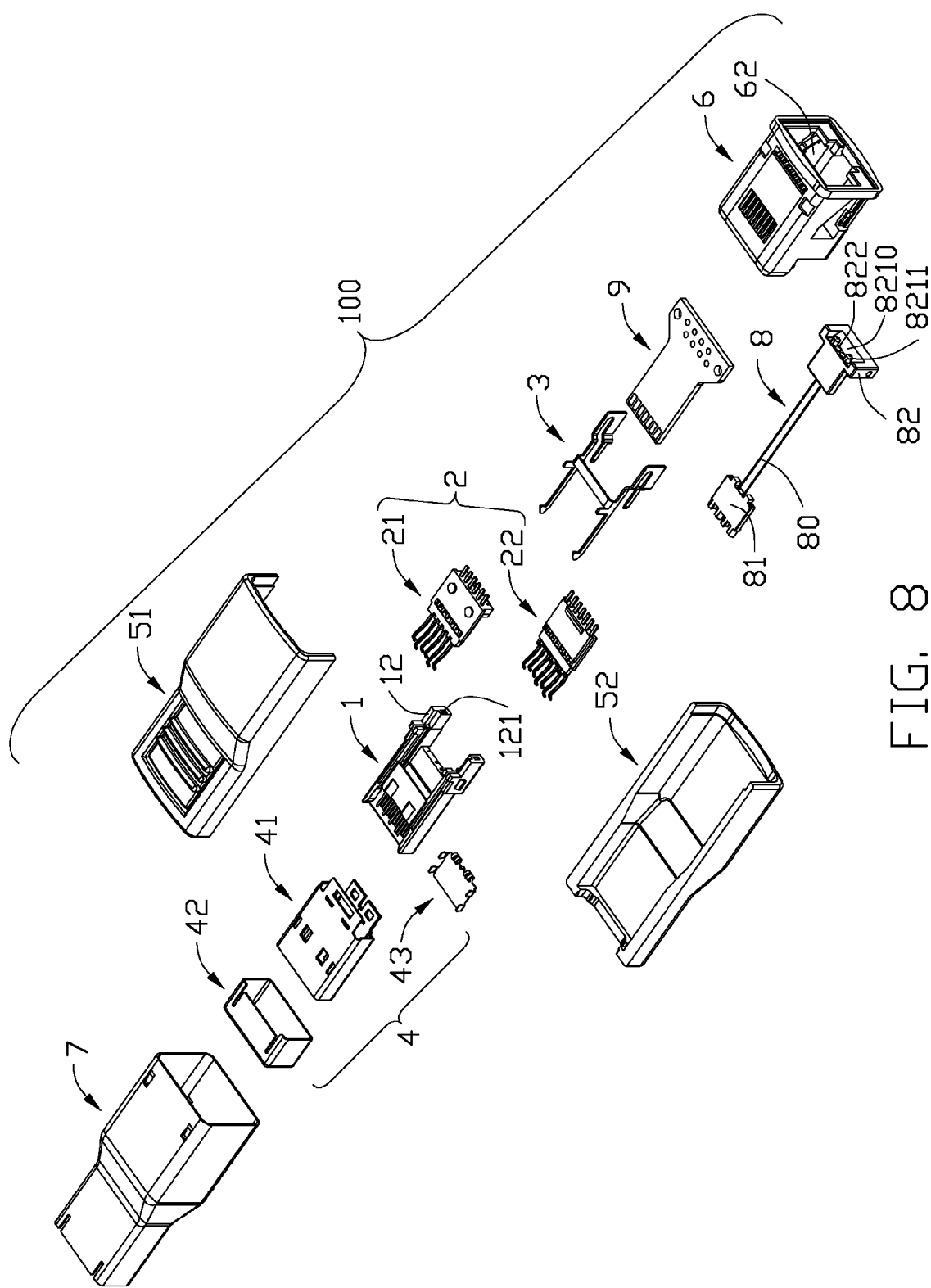
FIG. 8 is similar to FIG. 7, but viewed from another aspect.

Referring to FIGS. 6-8, the first connector is a DiiVA (Digital Interactive Interface for Video & Audio) plug connector and comprises an insulative housing 1, a terminal module 2 attached to the insulative housing 1, a latching member 3, and a metallic means 4.

The insulative housing 1 includes a main portion 10, a pair of mounting arms 12 extending rearwardly from two lateral sides of the main portion 10, and a tongue portion 11 extending forwardly from the main portion 10. A pair of longitudinal slot 101 are defined in the corresponding mounting arms 12. A receiving space 102 is recessed forwardly from a middle segment of a rear edge of the main portion 10. A cavity 104 is recessed downwardly from a top side of the tongue portion 11 and passes through a front end of the tongue portion 11. A set of passageways 1041 are recessed downwardly in the tongue portion 11 and communicating with the cavity 104. A depression 105 is defined in a bottom side of the tongue portion 11 and passes through the front end of the tongue portion 11. In addition, there is a stopping portion 1051 disposed in a middle segment of the depression 105. Two positioning slots 103 are located in a back section of a bottom side of the tongue portion 11. The two positioning slots 103 are spaced apart from each other along a transversal direction. Four grooves 106 are defined in the bottom side of the main portion 10, and there are two grooves 106 disposed between the two guiding slots 103 and the other two grooves 106 respectively located at outside of the two positioning slots 103.

The terminal module 2 includes a first terminal module 21 and a second terminal module 22. The first terminal module 21 has a first insulator 211 and a number of first terminals 212 combined together by insert-molding process. The first terminals 212 are divided into signal terminals and grounding terminals configured to be longer than the signal terminals. The first terminals 212 have first contacting portions 2120 disposed in front of the first insulator 211 and first tail portions 2122 extending backwardly beyond the first insulator 211. Two mounting holes 2110 are defined in a bottom side of the first insulator 211 and a protruding portion 2111 are formed on a top side of the first insulator 211. The second terminal module 22 has a second insulator 221 and a number of second terminals 222 combined together by insert-molding process. The second terminals 222 are divided into signal terminals and grounding terminals configured to be longer than the signal terminals. The first and second terminals 212, 222 are combined together to adapt for the DiiVA protocol. The second terminals 222 have second contacting portions 2220 disposed in front of an edge of the second insulator 221 and second tail portions 2222 extending backwardly beyond the second insulator 221. Two mounting posts 2210 are formed on a top side of the insulator 221. There is a transversal flange 2214 formed on a bottom side of a back segment of the second insulator 221. In addition, there are four passageways 2216 defined in the transversal flange 2214 and extending along a front-to-back direction. There are also two protruding tabs 2215 formed on the transversal flange 2214. The first terminal module 21 and the second terminal module 22 are assembled together, with the first and second contacting portions 2120, 2220 merged into one row, while the first and second tail portions 2122, 2222 separated into two distinct rows along an up-to-down direction. The mounting posts 2210 are inserted into the mounting holes 2110 so as to keep the first terminal module 21 and the second terminal module 22 together. The first terminal module 21 and the second terminal module 22 are assembled to the insulative housing 1, with front segments of the first and second insulators 211, 221 inserted into the receiving space 102, back segments of the insulators 211, 221 disposed between the two mounting arms 12, the first and second contacting portions 2120, 2220 extending into the passageways 1041 and exposed to the cavity 104.

The latching member 3 includes a pair of connecting arms 30, a pair of latching arms 32 and a pair of retention arms 33. The latching arms 32 and the retention arms 33 are spaced apart from each other and extend forwardly from the corresponding connecting arms 30. Each latching arm 32 and the corresponding retention arm 33 are located in a first vertical plane. Each connecting arm 30 is of U-shaped and locates in second vertical plane which is disposed outside the first vertical plane. A pressing tab 324 is formed on a top side of each latching arm 32. The retention arms 33 are inserted into positioning holes 121 recessed forwardly from rear faces of the corresponding mounting arms 12, and the latching arms 32 are received in the slots 101 of the insulative housing 1. The connecting arms 30 are located behind the mounting arms 12 and adjacent to the rear faces of the mounting arm 12, therefore, more space is left between the two connecting arms 30.

The metallic means 4 includes a first inner shell 41, a second inner shell 42 and a metallic cap 43. The first inner shell 41 includes a frame 411 defining a room to accommodate the tongue portion 11 therein. Two through holes 4110 are defined in a front segment of a top side 411a of the frame 411 to allow hooks 322 of the latching arm 32 passing through. A first engaging portion 4110a projects backwardly from the top side 411a. There is a positioning hole 4112 defined in the first engaging portion 4110a to latch with the protruding portion 2111 of the first terminal module 21. The frame 411 also has a bottom side 411b, with a second engaging portion 4110b projecting backwardly therefrom. There are two positioning holes 4114 defined in the second engaging portion 4110b to latch with the protruding tabs 2215 of the second terminal module 22. The second inner shell 42 surrounds a rear segment of the first inner shell 41 and has a pair of slits 421 formed at a top side thereof for the pressing tabs 324 passing through. The metallic cap 43 has a planar body 431, two cylindrical shaped first retainers 433 formed at a back side of the planar body 431, and a plurality of second retainers 435 formed at opposite sides of the planar body 441.

Figure 1:
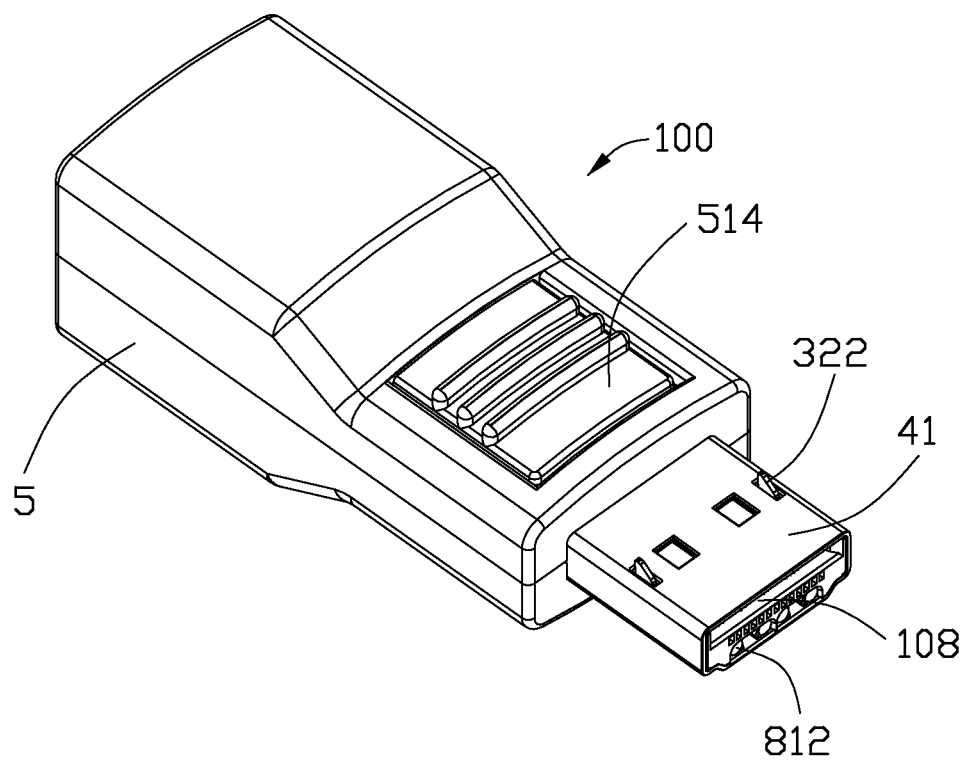
FIG. 1 is an assembled, perspective view of an adapter according to an embodiment of the present invention.
Figure 2:
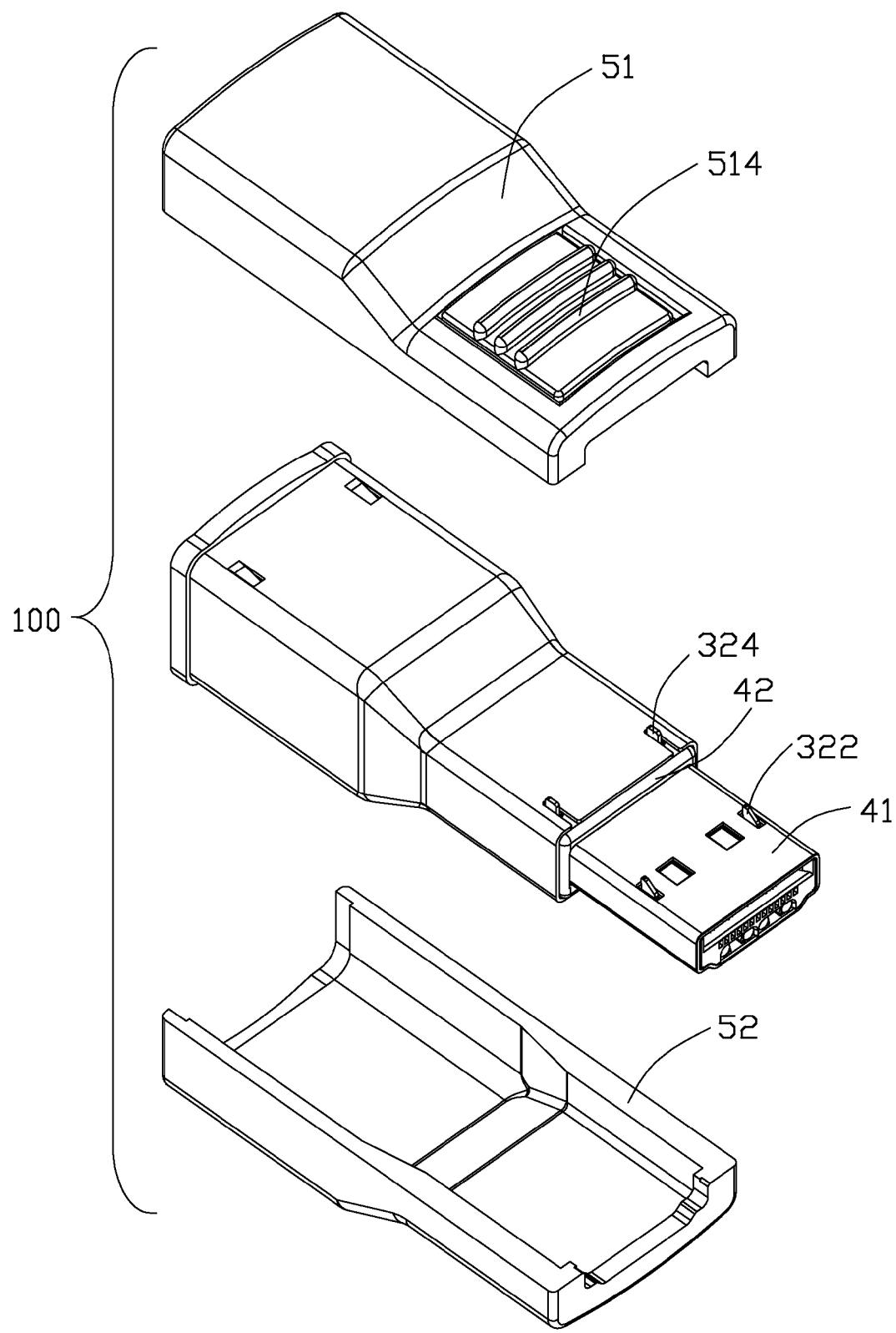
FIG. 2 is a partially exploded view of the adapter shown in FIG. 1.
Figure 3:
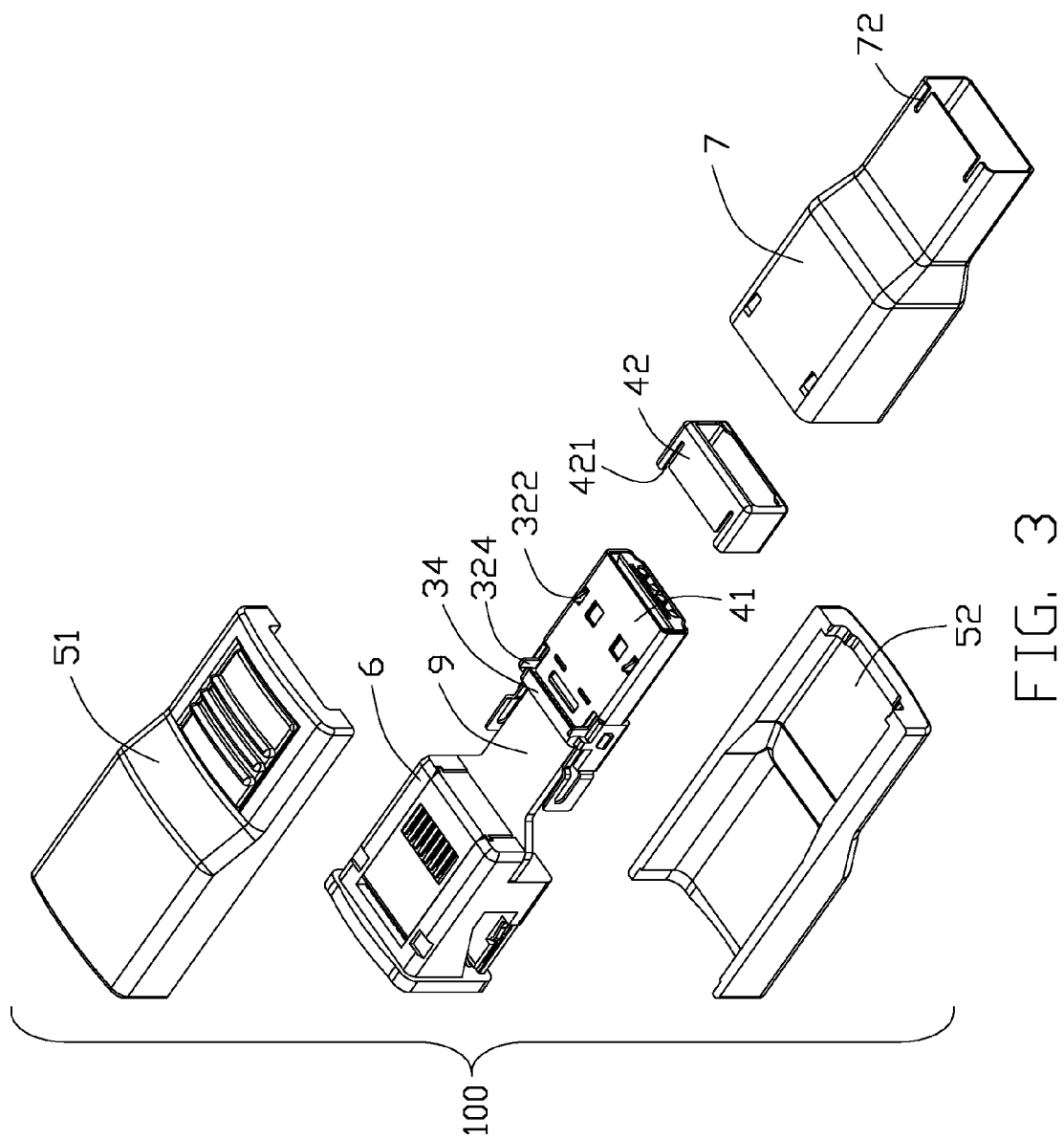
FIG. 3 is a further partially exploded view of the adapter shown in FIG. 2.
Figure 4:
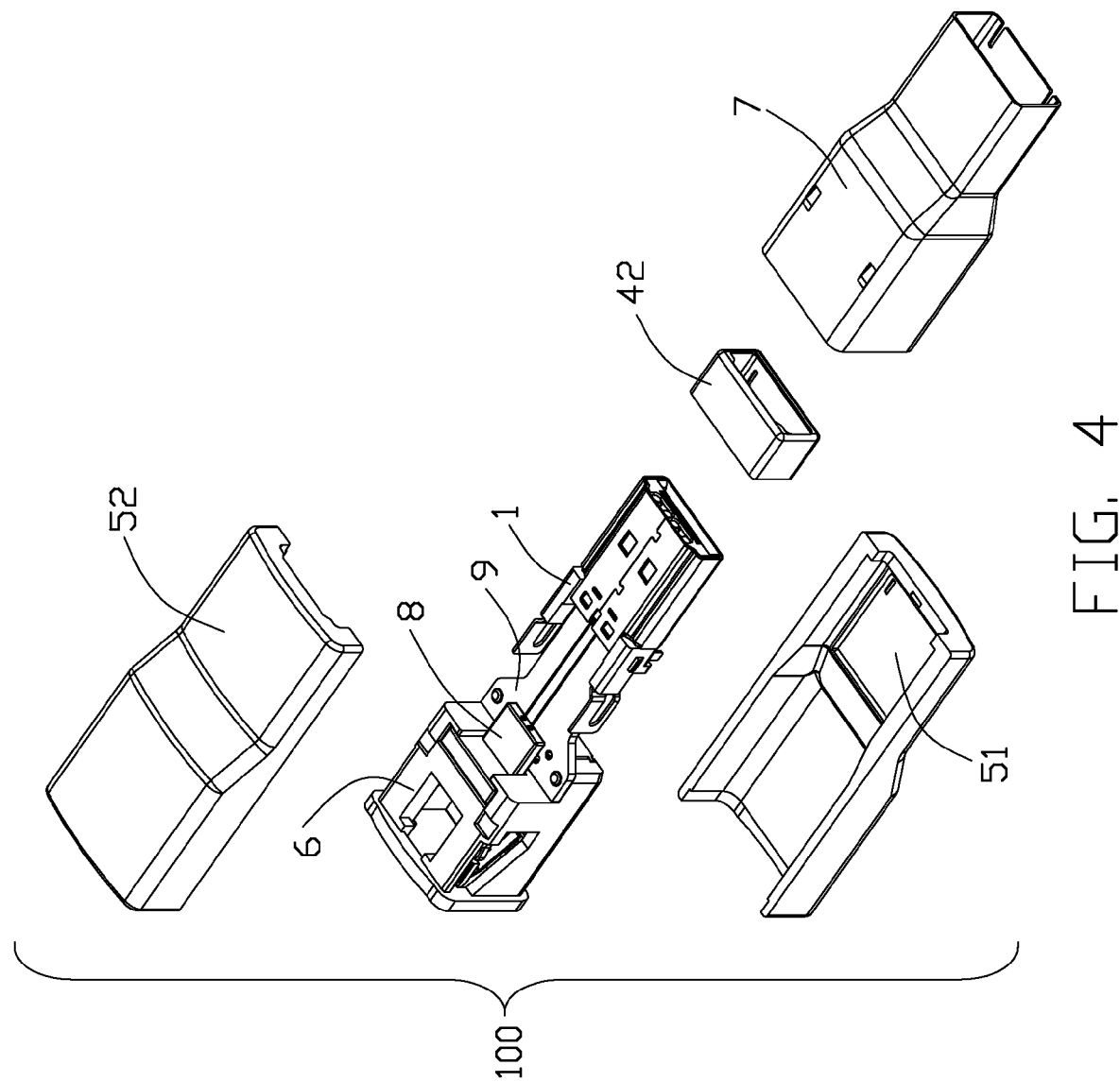
FIG. 4 is similar to FIG. 3, but viewed from another aspect.
Figure 5:
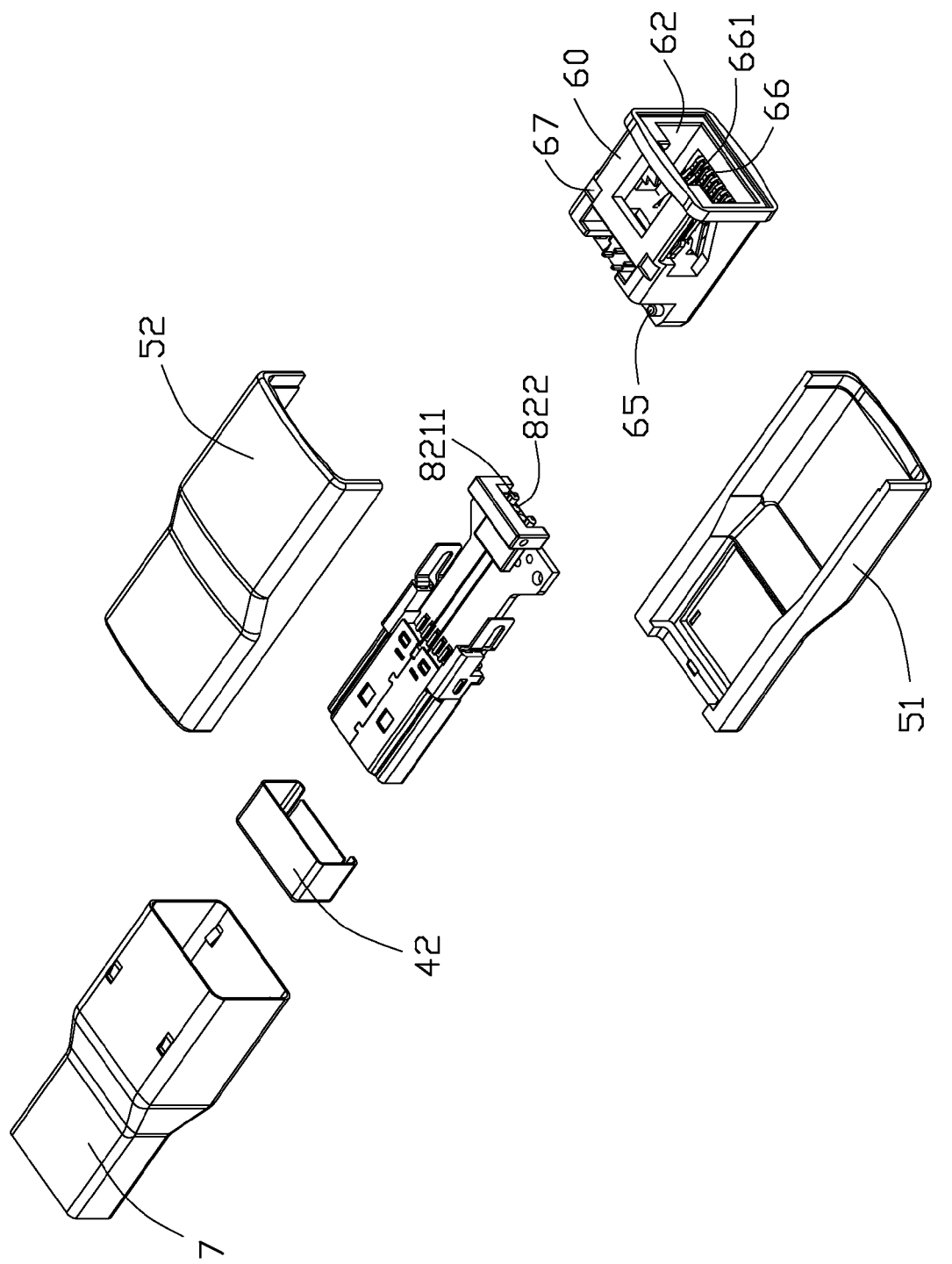
FIG. 5 is similar to FIG. 4, but viewed from another aspect.

Referring to FIGS. 5-7, the second connector is a RJ type modular jack and has a back side toward the first connector. The second connector comprises a dielectric body 6 and a plurality of contacts 66 combined together by insert-molding process. The dielectric body 6 has a chamber 62 recessed backwardly from a front face thereof for receiving a RJ type modular plug, a sinking portion 64 formed at a rear side thereof and defining a pair of retaining posts 65 protruding downwardly therefrom, and a retaining slot 63 located behind and communicating with the chamber 62 in the front-to-back direction. The contacts 66 have contacting sections 661 protruding into the chamber 62 for mating with the RJ type modular plug and tail sections 662 extending downwardly beyond the sinking portion 64.

The PCB 9 includes a main board 90, a plurality of golden fingers 93 formed on front sides of upper and lower surfaces of the main board 90, a plurality of apertures 92 passing through a rear side of the main board 90, and a pair of retaining holes 91 located at two lateral sides of the apertures 92. The first and second tail portions 2122, 2222 of the first connector are soldered onto the golden fingers 93 respectively. The tail sections 662 of the second connector are mounted through the apertures 92. Therefore, the first and second connectors could convert into each other via the PCB 9. The sinking portion 64 is seated onto the PCB 9 with the retaining posts 65 retained into the retaining holes 91 of the PCB 9.

Referring to FIGS. 5-8, the optical device 8 comprises a first optical module 81 disposed on the first connector, a second optical module 82 disposed on the second connector, and a number of optical fibers 80 optically connecting the first and second optical modules 81, 82. The first optical module 81 includes a number of first lenses 812, a first seat 811 supporting the first lenses 812 and two guiding members 85 extending backwardly from a back side of the first seat 811. The first lenses 812 are arranged in a row along a transversal direction and embedded in the first seat 811. In addition, the first lenses 811 extend beyond front end of the first seat 811, with gaps 813 formed between front portions of every two adjacent first lenses 812. The first lenses 812 could be one pair or two pairs. The first optical module 81 is assembled to the depression 105 of the insulative housing 1, with the two guiding members 85 respectively received in the two positioning slots 103. The first seat 811 of the first optical module 81 is stopped by the stopping portion 1051 located between one gap 813 of two adjacent lenses 812. The first and second contacting portions 2120, 2220 and the first optical module 81 are separated by the tongue portion 11 in the up-to-down direction. The first lenses 812 are located in a front of the first and second contacting portions 2120, 2220. The metallic cap 43 is assembled to the insulative housing 1, with the planar body 431 mounted to and shielding the first optical module 81, and the first retainers 433 accommodated in the positioning slots 103 and pressing against back edges of the guiding members 85. The second retainers 435 are sandwiched between lateral sides of the first seat 811 and inner lateral sides of the depression 105. In addition, the metallic cap 43 is accommodated in the frame 411, sandwiched between the insulative housing 1 and the bottom side 411b of the frame 411. The optical fibers 80 are respectively coupled to the first lenses 812 and pass through the grooves 106 and the passageways 2216.

The second optical module 82 includes a pair of second lenses 822 and a second seat 821 supporting the second lenses 822. The second lenses 822 are arranged in a row along the transversal direction and embedded in the second seat 821. The second seat 821 is retained in the retaining slot 63, and has a receiving groove 8210 recessed backwardly from a front face thereof and communicating with the chamber 62 in the front-to-back direction. The second lenses 822 are exposed to the receiving groove 8210 and communicate with the chamber 62 via the receiving groove 8210. A pair of columniations 8211 are formed into the receiving groove 8210 and are located at two lateral sides of the second lenses 822. A protrusion 823 extends backwardly from the second seat 821 and beyond the retaining slot 63. The PCB 9 is sandwiched between the protrusion 823 and the sinking portion 64 in the up-to-down direction. The contacting sections 661 of the contacts 66 are located at front of the second lenses 822. The optical fibers 80 are respectively coupled to the second lenses 822.

The metallic outer shell 7 has a front portion 75 surrounding the first connector with the frame 411 exposed to the exterior and a rear portion 76 surrounding the second connector with the chamber 62 communicating with the exterior. The front portion 75 has a pair of cuts 72 formed at a top side thereof and corresponding to the slits 421 of the second inner shell 42 for the pressing tabs 324 passing through. The second portion 76 has a set of spring tabs 73 protruding inwardly from a top and bottom sides thereof and locking into notches 67 formed on a top and bottom sides of the dielectric body 6.

The external case 5 includes an upper cover 51 and a bottom cover 52 combined together in the up-to-down direction and surrounding the metallic outer shell. A deformable button 514 is formed with the upper cover 51 and floatable along the up-to-down direction to drive the pressing tabs 324 of the latching arm 32 upwardly or downwardly so as to actuate the hooks 32 of the latching arm 32 protruding out of or into the frame 411.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An adapter comprising:
   a printed circuit board;
   a first connector mounted onto the printed circuit board and defining a room, the first connector comprising a tongue portion extending into the room and a plurality of terminals having contacting portions disposed on one side of the tongue portion and exposed to the room;
   a second connector mounted onto the printed circuit board and defining a chamber, the second connector comprising a plurality of contacts having contacting sections exposed to the chamber; and
   an optical device comprising a first optical module and a second optical module optically connecting with each other, the first optical module being disposed on another side of the tongue portion opposite to the contacting portions, and the second optical module being disposed on the second connector and communicating with the chamber.

2. The adapter according to claim 1, wherein the tongue portion has a cavity recessed at said one side and receiving the contacting portions, and a depression recessed at said another side and accommodating the first optical module.

3. The adapter according to claim 1, wherein the first optical module has a plurality of first lenses exposed to a front face of the tongue portion and communicating with exterior in a front-to-back direction directly.

4. The adapter according to claim 3, wherein the first lenses are located at front of the contacting portions of the terminals in the front-to-back direction.

5. The adapter according to claim 1, wherein the second optical module has a plurality of second lenses located behind the contacting sections of the contacts and communicating with the chamber in a front-to-back direction.

6. The adapter according to claim 5, wherein the second optical module has a seat retained in the second connector and supporting the second lenses, the seat has a receiving groove recessed backwardly from a front face thereof and accommodating the optical lenses.

7. The adapter according to claim 6, wherein the second connector has a sinking portion at a rear side thereof and seated onto the printed circuit board, the second optical module has a protrusion protruding backwardly from the seat, the printed circuit board is sandwiched between the protrusion and the sinking portion in an up-to-down direction.

8. The adapter according to claim 1, wherein the terminals have tail portions arranged in two rows in an up-to-down direction and mounted onto two opposite surfaces of the printed circuit board to sandwich the printed circuit board in the up-to-down direction.

9. An adapter comprising:
   a printed circuit board;
   a first plug connector mounted onto the printed circuit board and comprising a metallic means, an insulative housing having a tongue portion shielded by the metallic means, and a plurality of terminals coupled to the insulative housing for electrical signal transmission, the tongue portion having a cavity recessed downwardly at a top side thereof and a depression recessed upwardly at a bottom side thereof, the terminals having contacting portions disposed on the top side of the tongue portion and exposed to the cavity;
   a second receptacle connector mounted onto the printed circuit board to be interconvertible with the first plug connector and comprising a chamber, and a plurality of contacts for electrical signal transmission having contacting sections exposed to the chamber; and
   an optical device comprising a first optical module being received in the depression of the tongue portion for optical signal transmission, a second optical module being disposed on the second receptacle connector and communicating with the chamber for optical signal transmission, and a plurality of optical fibers optically connecting the first and second optical modules.

10. The adapter according to claim 9, wherein the first optical module has a plurality of first lenses exposed to a front face of the tongue portion and communicating with exterior in a front-to-back direction directly, the first lenses are located at front of the contacting portions of the terminals in the front-to-back direction.

11. The adapter according to claim 9, wherein the second optical module has a plurality of second lenses located at a rear side of the chamber and behind the contacting sections of the contacts to communicate with the chamber in a front-to-back direction.

12. The adapter according to claim 11, wherein the second optical module has a seat retained in a retaining slot of the second connector and supporting the second lenses, the seat has a receiving groove recessed backwardly from a front face thereof and communicating with the chamber in the front-to-back direction to accommodate the optical lenses.

13. The adapter according to claim 12, wherein the second connector has a sinking portion at a rear side thereof and seated onto the printed circuit board, the second optical module has a protrusion protruding backwardly from the seat, the printed circuit board is sandwiched between the protrusion and the sinking portion in an up-to-down direction.

14. The adapter according to claim 9, wherein the metallic means includes an inner shell defining a frame surrounding the tongue portion, and a metallic cap sandwiched between a bottom side of the frame and the insulative housing to shield the first optical module.

15. An adaptor comprising:
first and second connectors arranged with each other in a back-to-back manner as a sub-assembly substantially received within a shell,
the first connector including a first insulative housing defining a first mating port exposed to an exterior in a first direction, a plurality of first contacts disposed in the first housing with first contacting sections extending into the first mating port, and a first optical module retained in the first housing around the first mating port and communicating with the exterior in the first direction;
the second connector including a second insulative housing defining a second mating port exposed to the exterior in a second direction opposite to the first direction, a plurality of second contacts disposed in the second housing with second contacting sections extending into the second mating port, and a second optical module retained to the second housing around the second mating port and communicating with the exterior in the second direction; wherein
the first contacts electrically connect to the second contacts, and the first optical module optically connects to the second optical module.

16. The adaptor as claimed in claim 15, wherein the second mating port is larger than the first mating port, and the shell defines tubular configuration with opposite first and second outlet corresponding to the first mating port and the second mating port, and wherein a sub-assembly of the first connector and the second connector is assembled into the shell along the first direction via the second outlet.

17. The adaptor as claimed in claim 15, wherein the first contacts and the second contacts are electrically connected to each other via a printed circuit board located between the first connector and the second connector, while the first optical module and the second optical module are optically connected to each other via an optical fiber.

18. The adaptor as claimed in claim 17, wherein the first contacts are arranged on two terminal modules stacked with each other under condition that tails of the first contacts of said two terminal modules are arranged with two rows upon two opposite surfaces of the printed circuit board, respectively, while the first contacting sections of the contacts of both said two terminal modules are unified with one row.

19. The adaptor as claimed in claim 15, wherein the first optical module is exposed upon a front face of the connector in front of the first mating port in the first direction while the second optical module is hidden within the housing behind the second mating port opposite to said second direction.

20. The adaptor as claimed in claim 15, further including a case enclosing the shell wherein the case is equipped with a pressing button to downward press a deflectable latch mechanism of the first connector.

\* \* \* \* \*